(12) United States Patent
Masunaga et al.

(10) Patent No.: US 7,314,242 B2
(45) Date of Patent: Jan. 1, 2008

(54) VEHICLE RAIL AND VEHICLE SEAT APPARATUS

(75) Inventors: Satoshi Masunaga, Anjo (JP); Hideo Nihonmatsu, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 11/355,898

(22) Filed: Feb. 17, 2006

(65) Prior Publication Data

US 2006/0186688 A1    Aug. 24, 2006

(30) Foreign Application Priority Data

Feb. 22, 2005   (JP)   ............................ 2005-045891

(51) Int. Cl.
*B60N 2/07* (2006.01)
(52) U.S. Cl. .................................. 296/65.13
(58) Field of Classification Search ............ 296/63, 296/65.01, 65.13, 65.14; 248/429, 430; 384/7, 384/23, 42, 47, 55, 59
See application file for complete search history.

(56) References Cited

U.S. PATENT DOCUMENTS

| | | | | |
|---|---|---|---|---|
| 1,831,445 A | * | 11/1931 | Hansen | 384/42 |
| 3,105,723 A | * | 10/1963 | Hamaker, Jr. | 384/42 |
| 3,350,046 A | * | 10/1967 | Kirk | 248/430 |
| 3,756,094 A | * | 9/1973 | Mauron | 74/527 |
| 4,463,922 A | * | 8/1984 | Rees | 248/429 |
| 4,787,756 A | * | 11/1988 | Pilarski | 384/47 |
| 5,342,013 A | * | 8/1994 | Ito et al. | 248/429 |
| 5,746,409 A | * | 5/1998 | Rees | 248/422 |
| 2001/0013570 A1 | * | 8/2001 | Yoshida et al. | 248/429 |
| 2006/0186688 A1 | * | 8/2006 | Masunaga et al. | 296/65.13 |

FOREIGN PATENT DOCUMENTS

| | | | | |
|---|---|---|---|---|
| JP | 58126228 A | * | 7/1983 | |
| JP | 06107053 A | * | 4/1994 | |
| JP | 06135264 A | * | 5/1994 | |
| JP | 2002-254966 | | 9/2002 | |

\* cited by examiner

*Primary Examiner*—D. Glenn Dayoan
*Assistant Examiner*—Paul Chenevert
(74) *Attorney, Agent, or Firm*—Finnegan, Henderson, Farabow, Garrett & Dunner, LLP

(57) ABSTRACT

A vehicle rail fixed to a vehicle floor for relatively movably supporting a movable rail fixed to a seat includes a bottom wall member having a drawing portion at which the vehicle rail is fixed to the vehicle floor, and a guide member provided in a standing manner at both sides of the bottom wall member in a width direction for guiding a movement of the movable rail, the guide member being integrally formed with the bottom wall member by means of welding.

11 Claims, 4 Drawing Sheets

VEHICLE RAIL AND VEHICLE SEAT APPARATUS

This application is based on and claims priority under 35 U.S.C. § 119 to Japanese Patent Application 2005-045891, filed on Feb. 22, 2005, the entire content of which is incorporated herein by reference.

FIELD OF THE INVENTION

This invention relates to a vehicle rail and a vehicle seat apparatus.

BACKGROUND

Conventionally, a seat apparatus is known, which includes a seat slide mechanism for adjusting a position of a seat. The seat slide mechanism includes a lower rail serving as a vehicle rail fixed to a vehicle floor, and an upper rail fixed to the seat. The upper rail is movably supported by the lower rail. One of the known seat apparatuses is disclosed in JP2002-254966A. According to the disclosed seat apparatus, a lower rail includes a bottom wall portion and guide wall portions, which are integrally formed by means of roll forming or press forming. The guide wall portions are provided in a standing manner at both sides of the bottom wall portion in a width direction for guiding an upper rail.

Further, the lower rail is provided with a bracket at which the lower rail is fixed to the vehicle floor by means of a bolt. The bracket is provided for stably mounting the lower rail on the vehicle floor in accordance with a shape of the floor, and is provided for preventing a head of the fixing bolt from being protruded from the lower rail and interfered with the upper rail.

However, because the lower rail according to the disclosed seat apparatus requires the bracket, the number of operating members is increased and manufacturing cost of the seat apparatus is increased. Moreover, because a space for housing the head of the bolt is required between the bottom wall portion of the lower rail and a bottom wall portion of the bracket, the seat apparatus is occasionally getting larger.

In order to avoid an increase of the number of the operating members, the bottom wall portion may be integrally formed with, by means of drawing, an operating member shaped similar to the bracket at which the lower rail is fixed to the vehicle floor. However, with the configuration of the lower rail, which includes the bottom wall portion and the guide wall portion integrally formed with each other and includes a complicated shape in a cross-section, distortion is provoked if the above-mentioned process is applied to form the operating member shaped similar to the bracket at the bottom wall portion by means of drawing. Accordingly, an accuracy of the seat rail may occasionally be lowered.

Further, in a condition where the guide wall portion of the lower rail includes a shape, which is folded inwardly in a width direction thereof, a width of an opening of the rail may be narrowed. On this occasion, in order to avoid interference between the head of the bolt for fixing the lower rail to the vehicle floor and the guide wall portion, the width of the opening may be required to be wider, and the cross-section of the rail may thereby occasionally be getting larger. Accordingly, in a condition where the seat rail is mounted on the vehicle, because of an enlargement of the opening in the width direction, an appearance may occasionally be detracted. Further, a protector may be required in order to shut out a foreign object, and the manufacturing cost of the seat apparatus may thereby be increased.

A need thus exists for a vehicle rail and a vehicle seat apparatus which can be downsized in totality while restraining the increase of the number of the operating members.

SUMMARY OF THE INVENTION

According to an aspect of the present invention, a vehicle rail fixed to a vehicle floor for relatively movably supporting a movable rail fixed to a seat includes a bottom wall member having a drawing portion at which the vehicle rail is fixed to the vehicle floor, and a guide member provided in a standing manner at both sides of the bottom wall member in a width direction for guiding a movement of the movable rail, the guide member being integrally formed with the bottom wall member by means of welding.

BRIEF DESCRIPTION OF THE DRAWINGS

The foregoing and additional features and characteristics of the present invention will become more apparent from the following detailed description considered with reference to the accompanying drawings, wherein:

FIG. 1 is a side view illustrating a framework portion of a vehicle seat apparatus configured to be mounted on a vehicle such as an automobile, or the like.

DETAILED DESCRIPTION

An embodiment of the present invention will be explained with reference to illustrations of drawing figures as follows. A framework portion illustrated in FIG. 1 is arranged in a width direction of a seat (a direction perpendicular to a sheet of FIG. 1) in pairs.

Figure 1:
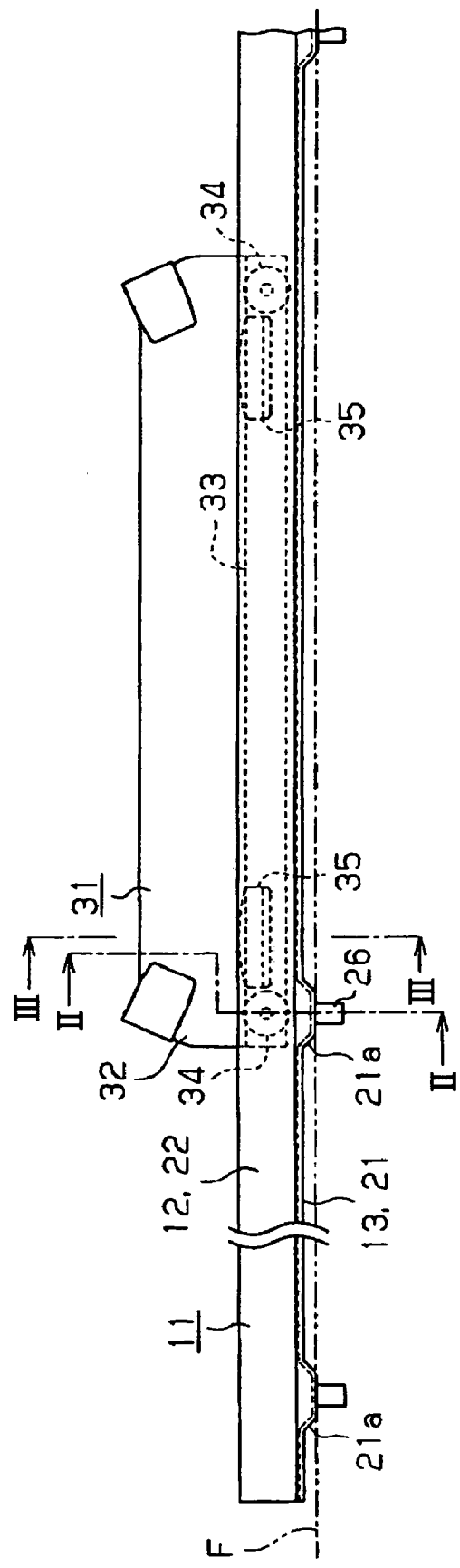
Figure 2:
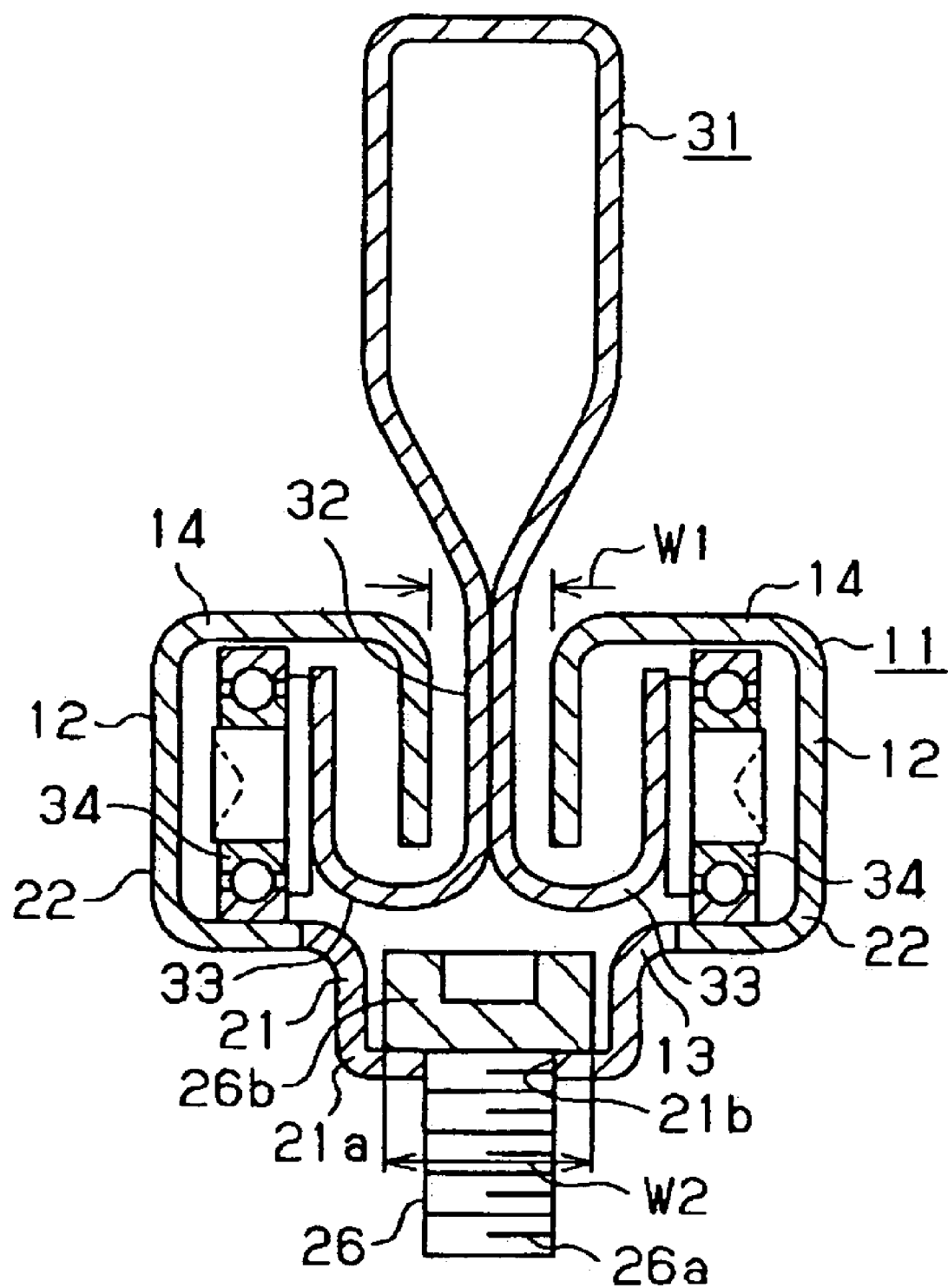
FIG. 2 is a sectional view taken along line II-II of FIG. 1.
Figure 3:
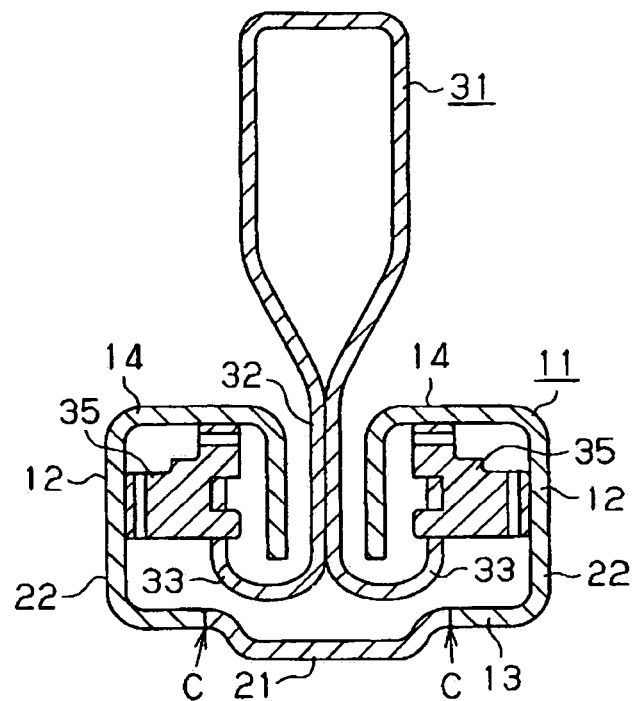
FIG. 3 is a sectional view taken along line III-III of FIG. 1.

As illustrated in FIG. 1, a lower rail 11 serving as a vehicle rail is directly fixed to a vehicle floor F and extends in a backward and forward direction of the vehicle. As illustrated in FIGS. 2-3, the lower rail 11 is provided with a pair of side wall portions 12 arranged in a standing manner at both sides thereof in a width direction, and is provided with a bottom wall portion 13 for connecting the side wall portions 12 with each other. Further, the lower rail 11 includes a substantially U-shaped cross-section. Each side wall portion 12 is continuously formed with, at an end portion (a top end portion), a first folded wall portion 14. Each first folded wall portion 14 is inflected inwardly in the width direction of the lower rail 11 and further folded to a base portion side of the side wall portion 12. The lower rail 11 includes an opening, which opens toward an upper side and has a width W1, between the first folded wall portions 14. The side wall portions 12 and the first folded wall portions 14 together configure guide wall portions for guiding a movement of an upper rail 31.

On this occasion, the lower rail 11 includes a bottom wall member 21 and a pair of guide members 22, both of which are formed by rolling or pressing a plate material. The bottom wall member 21 forms a center portion of the bottom wall portion 13 in the width direction. The guide member 22 and a side end portion of the bottom wall portion 13 in the width direction together form the guide wall portion (the side wall portion 12 and the first folded wall portion 14). The lower rail 11 is formed by integrally forming the bottom wall member 21 and the guide member 22 by means of laser welding, electronic beam welding, or the like. Connecting portions C (see FIG. 3) of the bottom wall member 21 and the guide member 22 are configured to be perpendicular to a flat portion extending in the width direction of the bottom wall portion 13. More particularly, the bottom wall member 21 and the guide member 22 are welded at end surfaces thereof facing with each other in the width direction. The bottom wall member 21 is formed with, by means of drawing, or the like, plural drawing portions 21a, in a longitudinal direction thereof at regular intervals. Each drawing portion 21a is protruded downward in a manner of table. According to the embodiment of the present invention, a cross-section of the drawing portion 21a is substantially trapezoidal in a longitudinal direction and is substantially rectangular in a width direction.

The drawing portion 21a is formed with a bolt insert hole (i.e., a hole) 21b penetrating through a center portion thereof in a substantially vertical direction. A shaft portion 26a of a fixing bolt (i.e., a fixing member) 26 for fixing the lower rail 11 to the vehicle floor F is inserted through the bolt insert hole 21b. The fixing bolt 26 is inserted through the bottom wall member 21 (the bottom wall portion 13) from an opening side (an upper side) in such a manner that the head portion 26b of the fixing bolt 26 is housed in a protrude length of the drawing portion 21a.

The head portion 26b of the fixing bolt 26 includes a width W2, which is smaller than a width of the drawing portion 21a and larger than the width W1. The fixing bolt 26 is mounted in the lower rail 11 in such a manner that the fixing bolt 26 is preliminarily inserted through the bottom wall member 21, which is preliminarily formed with the drawing portion 21a and the bolt insert hole 21b in a condition where the bottom wall member 21 is in a state of a single member, before the guide member 22 is connected to the bottom wall member 21. More particularly, although the head portion 26b of the fixing bolt 26 includes the width W2, which is wider than the width W1, an assembling of the fixing bolt 26 may not be disturbed because the fixing bolt 26 is mounted in the lower rail 11 before the guide member 22 is connected to the bottom wall member 21. Further, the fixing bolt 26 (the head portion 26b) is cramped by means of a jig (e.g. a driver), which is inserted from the opening in the substantially vertical direction, and the lower rail 11 is thereby fixed to the vehicle floor F. The present invention is applicable as long as the width W1 ensures a width through which the jig can be inserted. On this occasion, the lower rail 11 (the bottom wall member 21) is directly fixed to the vehicle floor in a stable manner while adjusting a height by means of the drawing portion 21a.

The upper rail 31 serving as a movable rail extends in the backward and forward direction of the vehicle, and is fixed to a frame (not shown) serving as a framework of a seat cushion (the seat). As illustrated in FIGS. 2-3, the upper rail 31 is provided with support wall portions 32 and second folded wall portions 33 continuously formed from an end portion (a bottom end portion) of the support wall portions 32. The support wall portions 32 are extended in the substantially vertical direction between the first folded wall portions 14 of the lower rail 11. Each second folded wall portion 33 is inflected outwardly in the width direction and further folded so as to be enclosed between the side wall portion 12 and the first folded wall portions 14. Further, the upper rail 31 includes a substantially inverted T-shaped cross-section.

As illustrated in FIG. 2, the upper rail 31 is supported by the lower rail 11 by means of a bearing 34, which is fixed at an outer surface of the second folded wall portion 33 and rotatably moves along the bottom wall portion 13. Further, as illustrated in FIG. 3, the upper rail 31 is engaged with the lower rail 11 by means of a guide shoe 35. The guide shoe 35 is fixed at the outer surface of the second folded wall portion 33 and slides along the side wall portion 12 and the first folded wall portion 14 (the guide wall portion). Thereby, because of a rotation of the bearing 34 along the side wall portion 12, the upper rail 31 is slidably supported by the lower rail 11 in the longitudinal direction (the backward and forward direction of the vehicle) in such a manner that the guide shoe 35 is guided by means of the side wall portion 12 and the first folded wall portion 14. On this occasion, because the head portion 26b of the fixing bolt 26 is immersed in the drawing portion 21a, the head portion 26b of the fixing bolt 26 does not interfere with the upper rail 31.

Next, a manufacturing process of the lower rail 11 and an assembling process of the lower rail 11 relative to the vehicle floor F will be explained hereinafter. In the manufacturing process of the lower rail 11, the bottom wall member 21 and the guide member 22 are formed by rolling or pressing the plate material. On this occasion, formation of the drawing portion 21a by means of the drawing and formation of the bolt insert hole 21b are preliminarily be performed in a condition where the bottom wall member 21 is in the state of the single member. Further, the fixing bolt 26 is preliminarily inserted through the bolt insert hole 21b in a condition where the bottom wall member 21 is in the state of the single member. Then, in a condition where the bottom wall member 21 and the guide member 22 are firmly held by mean of an appropriate fixing tool, the bottom wall member 21 and the guide member 22 are engaged by means of the laser welding, the electronic beam welding, or the like.

The lower rail 11, through which the fixing bolt 26 is preliminarily inserted, is fixed to the vehicle floor F by cramping the fixing bolt 26 by means of the jig which is inserted from the opening in the substantially vertical direction. According to the embodiment of the present invention, the following effects can be obtained.

According to the embodiment of the present invention, because the bottom wall member 21 includes the drawing portion 21a at which the lower rail 11 is fixed to the vehicle floor F, an extra operating member (e.g. a bracket) is not necessarily be added. Therefore, an increase of the number of operating members can be restrained. Further, the lower rail 11 can be downsized in totality relative to a condition where the extra operating member is added. Moreover, the lower rail 11 can be fixed to the vehicle floor F directly in a stable manner while adjusting the height by means of the drawing portion 21a.

Further, in the manufacturing process of the lower rail 11, the drawing portion 21a is preliminarily formed in a condition where the bottom wall member 21 is in the state of the single member. Thereafter, the bottom wall member 21 and the guide member 22 are integrally formed by means of the welding. Accordingly, degradation of an accuracy of a shape of the guide member 22 can be restrained.

According to the embodiment of the present invention, because the fixing bolt 26 for fixing the lower rail 11 to the vehicle floor F is inserted through the bottom wall portion 13, the extra operating member (e.g. the bracket) is not necessarily added. Therefore, the increase of the number of the operating members can be restrained and downsizing of the lower rail 11 in totality can be achieved relative to a condition where the extra operating member is added.

Further, in the manufacturing process of the lower rail 11, the fixing bolt 26 is preliminarily inserted through the bottom wall member 21 in a condition where the bottom wall member 21 and the guide member 22 are separated. Thereafter, the separated operating members (the bottom wall member 21 and the guide member 22) are integrally formed by means of the welding. Therefore, the guide wall portion folded inwardly in the width direction (the first folded wall portion 14) is not required to ensure a width of the opening for preventing interference with the head 26*b* of the fixing bolt 26. Accordingly, a cross-section of the rail can be downsized.

According to the embodiment of the present invention, the separated operating members (the bottom wall member 21 and the guide member 22) are not required to have an identical thickness or material with each other. Accordingly, the bottom wall member 21 and the guide member 22 can adopt the thickness or the material in accordance with a desirable amount of rigidity to each position of the lower rail 11 (e.g. a position where the lower rail 11 is fixed to the vehicle floor F and a position where the lower rail 11 guides the upper rail 31). Therefore, a required strength can be ensured without improving quality of the material.

Generally, various types of the vehicle include various types of the vehicle floor F, respectively, and accordingly the various types of the vehicle include various shapes of the bottom wall portion 13 of the lower rail 11 (a shape, a position, or the like, of the drawing portion 21*a* for adjusting a width or the height), respectively. In contrast, the guide wall portion of the lower rail 11 (the side wall portion 12 and the first folded wall portion 14) is standardized among the various types of the vehicle, and thus each type of the vehicle includes a shape (cross-section) of the guide wall portion identical with each other. According to the embodiment of the present invention, because the bottom wall member 21, which mainly forms the bottom wall portion 13, and the guide member 22, which forms the guide wall portion, are individually configured, a standardized operating member (the guide member 22) can be used in part. Thereby, reduction of the number of the operating members and manufacturing cost can be performed. Further, the present invention can horizontally be developed to the various types of the vehicle by changing only the bottom wall member 21.

A conventional lower rail, the operating members of which are integrally formed at the same time by means of roll forming or press forming, may occasionally be difficult to change the cross-section thereof in part in the longitudinal direction. It is because a strength of a punch dies may be deficient because of a constraint of a size of a form structure and the cross-section of the lower rail in case of the roll forming. Further, it is because the manufacturing process is constrained in case of the press forming. According to the embodiment of the present invention, because the bottom wall member 21 and the guide member 22 are individually formed from the plane material, they can be formed in a simple process relative to a condition where the whole operating member of the lower rail is formed at the same time. Further, the lower rail can adopt the shape (the cross-section), which was difficult to be manufactured by means of the roll forming or the press forming. Therefore, a degree of freedom of a product design can be expanded.

According to the embodiment of the present invention, the bottom wall member 21 including the bolt insert hole 21*b* can be formed by means of the press forming without difficulty. Accordingly, the bottom wall member 21 can be formed into almost any shape by means of the press forming, and an overall manufacturing expense can thereby be reduced.

According to the embodiment of the present invention, because the separated operating members (the bottom wall member 21 and the guide member 22) configure the lower rail 11, the material corresponding to a function of the cross-section of the lower rail 11 can be adopted in part. Further, a special process, such that the guide member 22 guiding the upper rail 31 is provided with a film having a smaller degree of friction coefficient, can relatively readily be performed in a condition where the guide member 22 is in a state of a single member.

According to the embodiment of the present invention, because the pair of guide members 22 is symmetric with each other, they can be formed in an identical process. Further, in a condition where the guide member 22 is formed by means of the roll forming, a size of the cross-section of the lower rail 11 becomes less than, or equal to, half relative to a condition where the whole operating member of the lower rail 11 is formed at the same time. Accordingly, downsizing of a facility and the form can be achieved, and the reduction of the manufacturing cost can thereby be achieved.

According to the embodiment of the present invention, because the bottom wall member 21 and the guide member 22 are integrally formed by means of the welding (the laser welding or the electronic beam welding), which has a smaller degree of thermal distortion, the degradation of the accuracy of the shape (the cross-section) of the rail can be restrained.

According to the embodiment of the present invention, the vehicle seat apparatus can be downsized in totality while restraining the increase of the number of the operating members. However, the present invention is not limited to the embodiment disclosed above. Variations and changes will be explained hereinafter.

Figures 4A, 4B:
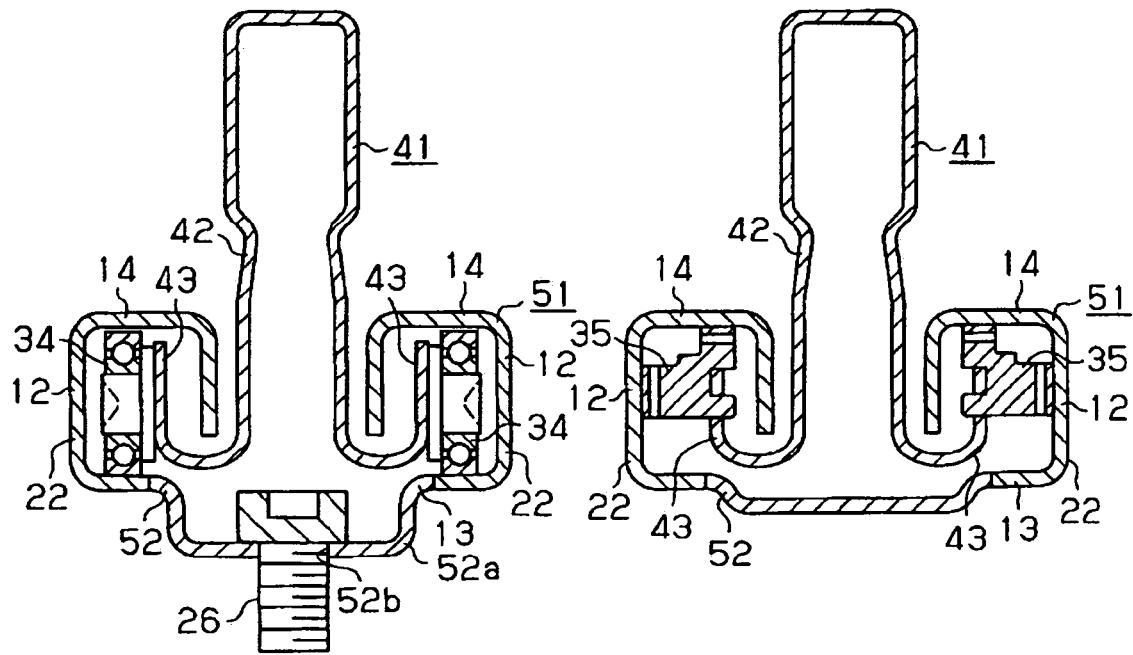
FIG. 4A is a sectional view illustrating a variation of the present invention.
FIG. 4B is a sectional view illustrating the variation of the present invention.

According to a variation of the present invention, a lower rail (i.e., a vehicle rail) 51 corresponding to an upper rail (i.e., movable rail) 41 illustrated in FIGS. 4A-4B may be adopted. More particularly, the upper rail 41 includes support wall portions 42, which have a substantially U-shaped cross-section and opens toward lower side, and a folded wall portion 43 continuously formed from each opening end of the support wall portion 42. The folded wall portion 43 includes a shape similar to the second folded wall portion 33 of the aforementioned embodiment of the present invention. Accordingly, relative to the aforementioned embodiment, the upper rail 41 may be wider in a width direction corresponding amount of an opening width of the support wall portion 42. Further, the lower rail 51 is formed by integrally forming a bottom wall member 52, which is enlarged corresponding amount of the opening width of the support wall portion 42, and the guide member 22 by means of the laser welding, the electronic beam welding, or the like. The bottom wall member 52 includes a drawing portion 52*a*, a width of which is wider than that of the drawing portion 21*a* of the embodiment disclosed above. The drawing portion 52*a* is formed with a bolt insert hole 52*b* through which the fixing bolt 26 is inserted. According to the variation of the present invention, the guide member 22, which is common to the embodiment disclosed above, is used and only the configuration of the bottom wall member 52 is changed for corresponding to the upper rail 41 having a different shape from the upper rail 31 of the aforementioned embodiment.

Figure 5:
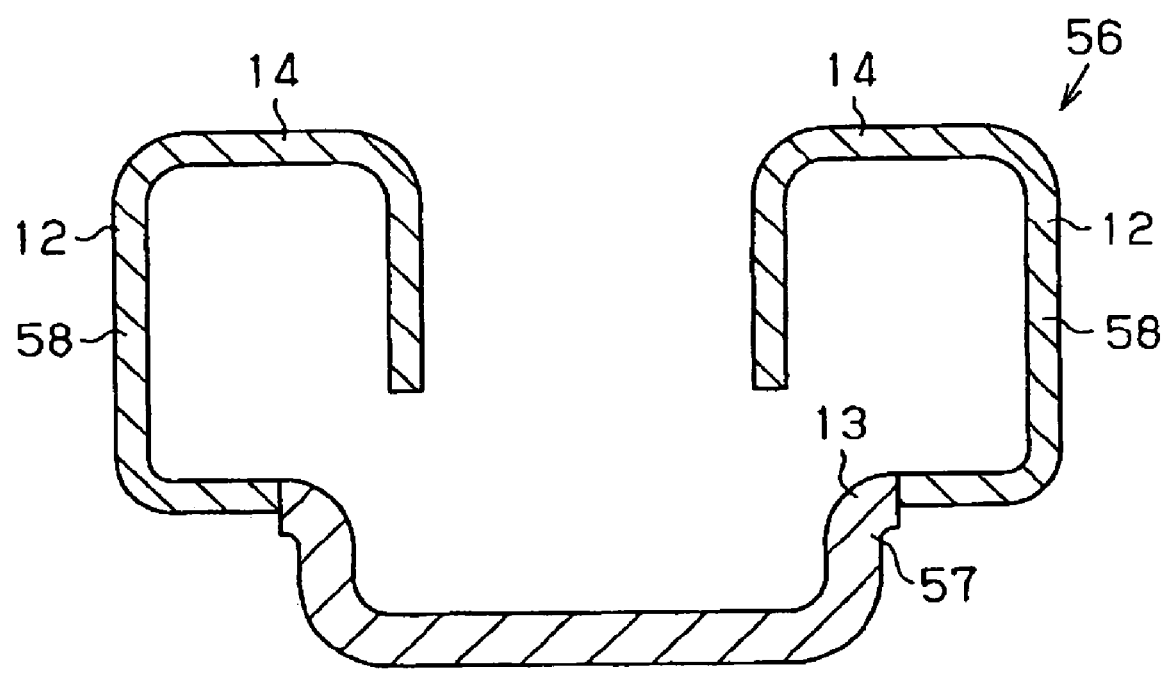
FIG. 5 is a sectional view illustrating another variation of the present invention.

Another variation of the present invention will be explained hereinafter with reference to FIG. 5. A lower rail (i.e., a vehicle rail) 56 may include a bottom wall member 57 and a guide member 58, which have a thickness different from each other. More particularly, a thickness of the bottom wall member 57 is greater than that of the guide member 58 to some degree. Accordingly, a required strength can be ensured without improving the quality of the material because the material (plate material), the thickness of which is corresponding a desirable amount of rigidity to a function of a cross-section of the lower rail 56, is used in part. Further, the increase of the manufacturing cost can be restrained.

Alternatively, or in addition, the material of the bottom wall member may have a tensile strength different from that of the guide member. Even in such condition, the required strength can be ensured without improving the quality of the material because the material having the tensile strength corresponding to the desirable amount of rigidity to the function of the cross-section of the lower rail is used in part. Further, because of the material having the tensile strength, the thickness of the panel material can be reduced, and the lower rail can be downsized in totality.

Alternatively or in addition, the material of the bottom wall member may have friction coefficient different from that of the guide member. More particularly, the guide member, which forms a contact surface with the guide shoe when the upper rail slides relative to the lower rail, may be formed from the material having the friction coefficient smaller than that of the bottom wall member. On this occasion, because the material, which has the friction coefficient corresponding to a desirable smoothness or lower friction to the function of the cross-section of the lower rail, is used in part, a required smoothness, or the like, can be ensured without improving the quality of the material. For example, if the guide member is formed from mirror finished stainless, which is a general-purpose item, the required smoothness, or the like, can be ensured without adding an extra process.

Further, the special process, such that the guide member is provided with the film having the smaller degree of the friction coefficient, can relatively readily be performed in a condition where the guide member is in the state of the single member. Further, productivity of the vehicle rail is not disturbed.

Alternatively or in addition, a shape of the pair of guide wall portions (the side wall portion 12 and the first folded wall portion 14) may not necessarily be identical with each other. For example, a protruding length of a first guide wall portion in a substantially vertical direction may be shorter degree than that of a second guide wall portion in the substantially vertical direction.

The present invention is applicable even when the guide member 22 is made of several pieces of the operating member. Alternatively, or in addition, the drawing portion 21a may be omitted. On this occasion, the lower rail 11 can be made of any number of the operating members as long as the lower rail 11 includes an operating member through which the fixing bolt 26 can be inserted.

Alternatively or in addition, the fixing member may include a caulking pin. Further, the seat apparatus according to the embodiment of the present invention may include more than two lower rails 11 and upper rails 31. Moreover, alternatively or in addition, the seat apparatus according to the embodiment of the present invention may include a single lower rail 11 and upper rail 31 as long as a sufficient strength and stability are ensured.

Alternatively or in addition, a moving direction of the seat in response to a relative movement of the lower rail and the upper rail may be a width direction of the vehicle.

According to the embodiment of the present invention, because the bottom wall member includes the drawing portion at which the lower rail is fixed to the vehicle floor, the extra operating member (e.g. the bracket) is not necessarily be added. Therefore, the increase of the number of the operating members can be restrained. Further, the vehicle rail can be downsized in totality relative to a condition where the extra operating member is added. Moreover, the lower rail can be fixed to the vehicle floor directly in the stable manner while adjusting the height by means of the drawing portion.

Moreover, in the manufacturing process of the vehicle rail, the drawing portion is preliminarily formed in a condition where the bottom wall member is in the state of the single member. Thereafter, the bottom wall member and the guide member are integrally formed by means of the welding. Thereby, the degradation of the accuracy of the shape of the guide member can be restrained.

According to the embodiment of the present invention, because the fixing member for fixing the vehicle rail to the vehicle floor is inserted through the bottom wall portion, the extra operating member (e.g. the bracket) is not necessarily be added. Therefore, the increase of the number of the operating members can be restrained and downsizing of the vehicle rail in totality can be achieved relative to a condition where the extra operating member is added.

Further, in the manufacturing process of the vehicle rail, the fixing member is preliminarily inserted through the operating member forming the bottom wall portion in a condition where the operating members of the vehicle rail are separated. Thereafter, the separated operating members are integrally formed by means of the welding. Thereby, the guide wall portion, which is folded inwardly in the width direction, is not required to ensure the width of the opening for preventing the interference with the head of the fixing member. Therefore, the cross-section of the rail can be downsized.

According to the embodiment of the present invention, because each operating member adopts the thickness or the material in accordance with the desirable amount of rigidity to each position of the vehicle rail (e.g. the position where the lower rail is fixed to the vehicle floor and the position where the lower rail 11 guides the upper rail), the required strength can be ensured without improving the quality of the material.

According to the embodiment of the present invention, the vehicle seat apparatus can be downsized in totality while restraining the increase of the operating member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle rail fixed to a vehicle floor for relatively movably supporting a movable rail fixed to a seat comprising:
   a bottom wall member having a drawing portion at which the vehicle rail is fixed to the vehicle floor; and
   a guide member provided in a standing manner at both sides of the bottom wall member in a width direction for guiding a movement of the movable rail, the guide member being integrally formed with the bottom wall member by means of welding;
   wherein the bottom wall member is different from the guide member in thickness.

2. The vehicle rail according to claim 1, wherein the drawing portion includes a hole through which a fixing member is inserted.

3. The vehicle rail according to claim 1, wherein the drawing portion is protruded downward in a manner of table.

4. The vehicle rail according to claim 1, wherein the guide members are symmetrically provided in pairs.

5. The vehicle rail according to claim 1, wherein the bottom wall member is different from the guide member in material.

6. The vehicle rail according to claim 1, wherein the means of welding includes laser welding and electronic beam welding.

7. The vehicle rail according to claim 1, wherein a material of the bottom wall member includes a tensile strength different from the guide member.

8. The vehicle rail according to claim 1, wherein a material of the bottom wall member includes a friction coefficient different from the guide member.

9. A vehicle seat apparatus comprising the vehicle rail according to the claim 1.

10. A vehicle rail fixed to a vehicle floor for relatively movably supporting a movable rail fixed to a seat comprising:
    a bottom wall member having a portion at which the vehicle rail is fixed to the vehicle floor; and
    a guide member provided in a standing manner at both sides of the bottom wall member in a width direction for guiding a movement of the movable rail, the guide member being integrally formed with the bottom wall member by means of welding so that the vehicle rail includes a substantially U-shaped cross-section by the bottom wall member and the guide member;
    wherein the bottom wall member is different from the guide member in thickness.

11. A vehicle rail fixed to a vehicle floor for relatively movably supporting a movable rail fixed to a seat comprising:
    a bottom wall member having a portion at which the vehicle rail is fixed to the vehicle floor; and
    guide members provided in a standing manner at both sides of the bottom wall member in a width direction for guiding a movement of the movable rail, the guide members being integrally formed with the bottom wall member so that the bottom wall member is provided between the guide members;
    wherein the bottom wall member is different from the guide member in material.

* * * * *